US007751653B2

(12) United States Patent
Bodnar et al.

(10) Patent No.: US 7,751,653 B2
(45) Date of Patent: Jul. 6, 2010

(54) METHOD FOR COLLECTING DATA FOR COLOR MEASUREMENTS FROM A DIGITAL ELECTRONIC IMAGE CAPTURING DEVICE OR SYSTEM

(75) Inventors: Gary N. Bodnar, Springboro, OH (US); Christopher H. Pearson, Springboro, OH (US); Donald J. Staufenberg, Dublin, OH (US); Joshua M. Broehl, Worthington, OH (US); Bryan M. Shova, Columbus, OH (US); Ronald J. Duke, Centerville, OH (US); Karl F. Seibert, Kettering, OH (US)

(73) Assignee: Color Savvy Systems Limited, Miamisburg, OH (US)

( * ) Notice: Subject to any disclaimer, the term of this patent is extended or adjusted under 35 U.S.C. 154(b) by 1258 days.

(21) Appl. No.: 11/201,854

(22) Filed: Aug. 11, 2005

(65) Prior Publication Data

US 2006/0078199 A1      Apr. 13, 2006

Related U.S. Application Data

(63) Continuation-in-part of application No. 11/128,881, filed on May 13, 2005.

(60) Provisional application No. 60/570,562, filed on May 13, 2004, provisional application No. 60/570,563, filed on May 13, 2004, provisional application No. 60/600,687, filed on Aug. 11, 2004, provisional application No. 60/600,969, filed on Aug. 12, 2004.

(51) Int. Cl.
G06K 7/00       (2006.01)
G06K 9/20       (2006.01)
G06K 9/22       (2006.01)
G06K 9/00       (2006.01)

(52) U.S. Cl. .................. 382/315; 382/162; 382/168; 382/312; 382/313

(58) Field of Classification Search ................. 382/128, 382/162, 168, 312, 313, 315
See application file for complete search history.

(56) References Cited

U.S. PATENT DOCUMENTS 3,771,877 A * 11/1973 Rosencranz ................. 356/446
(Continued)

FOREIGN PATENT DOCUMENTS

DE          19633557          3/1998
(Continued)

OTHER PUBLICATIONS

Vrhel, M.J. et al., "Color Device Calibration: A Mathematical Formulation," I.E.e.E. Transaction on Image Processing, vol. 8, No. 12, pp. 1796-1806 (Dec. 1999).
Pratt, W.K., *Digital Image Processing*, John Wiley & Sons, NY, pp. 171-191 (1991).

*Primary Examiner*—Samir A Ahmed
*Assistant Examiner*—Li Liu
(74) *Attorney, Agent, or Firm*—Thompson Hine LLP

(57) ABSTRACT

A method for providing an intensity or brightness measurement using a digital image-capturing device comprising: selecting a target area within a field of view of the image-capturing device, the target area containing pixels; determining the brightness of pixels in the target area; accumulating the brightness values of the pixels in the target area; and determining a pixel value representative of the pixels in the target area. A device for making color measurements comprising an image-capture device, a processor or logic device, and a memory location for accumulating color data, and the processor or logic device is programmed to perform color measurements by accumulating the data for pixels located in the target area in memory, and determining a representative color value.

7 Claims, 8 Drawing Sheets

U.S. PATENT DOCUMENTS

| | | | |
|---|---|---|---|
| 3,971,065 | A | 7/1976 | Bayer |
| 4,053,235 | A * | 10/1977 | Hampton et al. ............. 356/418 |
| 4,405,940 | A * | 9/1983 | Woolfson et al. ........... 348/170 |
| 4,564,945 | A | 1/1986 | Glover et al. |
| 4,991,007 | A | 2/1991 | Corley |
| 5,260,584 | A * | 11/1993 | Popson et al. .......... 250/559.01 |
| 5,371,538 | A | 12/1994 | Widger |
| 5,526,285 | A | 6/1996 | Campo et al. |
| 5,537,516 | A | 7/1996 | Sherman et al. |
| 5,760,829 | A | 6/1998 | Sussmeier |
| 5,850,472 | A | 12/1998 | Alston et al. |
| 5,914,786 | A * | 6/1999 | Koe ........................... 356/446 |
| 6,069,973 | A | 5/2000 | Lin et al. |
| 6,084,983 | A | 7/2000 | Yamamoto |
| 6,205,243 | B1 | 3/2001 | Migdal et al. |
| 6,369,895 | B1 | 4/2002 | Keeney |
| 6,525,819 | B1 | 2/2003 | Delawter et al. |
| 6,546,119 | B2 * | 4/2003 | Ciolli et al. ................. 382/104 |
| 6,580,820 | B1 | 6/2003 | Fan |
| 6,594,377 | B1 * | 7/2003 | Kim et al. ................... 382/117 |
| 6,654,048 | B1 | 11/2003 | Barrett-Lennard et al. |
| 6,944,494 | B2 * | 9/2005 | Forrester et al. ............ 600/478 |
| 7,102,669 | B2 * | 9/2006 | Skow ....................... 348/222.1 |
| 7,233,871 | B2 * | 6/2007 | Raymond et al. ............. 702/83 |
| 7,336,401 | B2 | 2/2008 | Unal et al. |
| 2002/0012895 | A1 | 1/2002 | Lehmann |
| 2002/0126328 | A1 | 9/2002 | Lehmeier et al. |
| 2003/0071998 | A1 | 4/2003 | Krupka et al. |
| 2003/0076498 | A1 | 4/2003 | Pfister |
| 2003/0156118 | A1 * | 8/2003 | Ayinde ........................ 345/589 |
| 2003/0169347 | A1 | 9/2003 | Jenkins |
| 2003/0174886 | A1 * | 9/2003 | Iguchi et al. ................. 382/167 |
| 2004/0078299 | A1 | 4/2004 | Down-Logan et al. |
| 2004/0136579 | A1 * | 7/2004 | Gutenev ..................... 382/128 |
| 2004/0167709 | A1 * | 8/2004 | Smitherman et al. ......... 701/208 |
| 2004/0179101 | A1 | 9/2004 | Bodnar et al. |
| 2004/0189837 | A1 * | 9/2004 | Kido .......................... 348/241 |
| 2005/0018890 | A1 | 1/2005 | McDonald et al. |
| 2007/0225560 | A1 * | 9/2007 | Avni et al. .................. 600/118 |
| 2008/0128589 | A1 | 6/2008 | Drummond et al. |

FOREIGN PATENT DOCUMENTS

| | | |
|---|---|---|
| JP | 5-289206 | 11/1993 |
| JP | 2002-190959 | 7/2002 |
| WO | WO 03/029766 | 4/2003 |
| WO | WO 2004/018984 | 3/2004 |

* cited by examiner

METHOD FOR COLLECTING DATA FOR COLOR MEASUREMENTS FROM A DIGITAL ELECTRONIC IMAGE CAPTURING DEVICE OR SYSTEM

CROSS-REFERENCE TO RELATED APPLICATIONS

This application claims priority from U.S. Provisional Application No. 60/600,687 filed Aug. 11, 2004 and from U.S. Provisional Application No. 60/600,969 filed Aug. 12, 2004. This application is also a Continuation-In-Part of U.S. application Ser. No. 11/128,881 filed May 13, 2005 which claims priority from U.S. Provisional Application No. 60/570,562 and from U.S. Provisional Application No. 60/570,563 both filed May 13, 2004.

FIELD OF THE INVENTION

This invention is a method for collecting data from an electronic image-capturing device or system in a way that enables it to provide accurate and consistent information about the colors of one or more points or regions of the image. A color measurement device is also provided.

BACKGROUND OF THE INVENTION

Traditional methods for building a color measurement device typically involve high-precision optics, complex mirrors/prisms, sophisticated illumination systems, and/or specialized processing capabilities (e.g., low-noise analog-to-digital converters). The advent of the digital imaging chip—although intended to capture moving or still images—created an intriguing alternative "engine" for making a color measurement based on it's simplicity and low cost.

However, digital imaging chips, when used as intended to capture images, are typically ineffective at making precise color measurements. This is due in part to the large amount of data generated by each image. This massive amount of data from the "raw" image often is compressed to increase the transmission rate and color information is typically lost in this process. For a color measurement at a specific point, only generally a fraction of the total image data is necessary. Finally, most imaging chips have built-in features that make automatic adjustments (e.g., of shutter width and sensitivity). These allow the chip to produce good images under a wide variety of conditions and in changing conditions. However these features become a barrier to obtaining an accurate color measurement, as they can make the response of the chip to a color stimulus unpredictable. All of these factors combine with the fundamental instabilities and noise inherent in a typical analog-digital electronic system to limit an imaging chip's ability to make precise, accurate, and repeatable color measurement.

SUMMARY OF THE INVENTION

In accordance with one embodiment of the invention, an electronic image capture device (typically an imaging chip such as that used in a digital camera or the camera itself) is interfaced with a processor or logic device to process data generated by the imaging device on a pixel-by-pixel basis and sufficient memory to accumulate the data of interest. In one embodiment, regions of the image for which an accurate color reading is desired are defined by their x-y pixel coordinates (one or more "regions of interest"). As the image capture device streams out data from each pixel, the processor determines whether that pixel data is from a region of interest. If so, the brightness value output from that pixel is placed in an accumulator. The term "brightness" as used herein includes intensity. This process is repeated over multiple images (frames), summing the new pixel values with the total of the previous pixel values in the accumulator(s). In one embodiment, once the desired number of pixel readings has been accumulated, the average pixel value is calculated by dividing the total by the number of values accumulated. In other embodiments, a median or other representative value can be calculated. In one embodiment, the data from the image capture device can be streamed into temporary memory, and the pixels of interest can be summed into the accumulators as a secondary operation. In one embodiment, for higher accuracy, the image capture device can be configured such that automatic adjustments and compensations are disabled, e.g., blanking is disabled, gain is minimized, integration time is maximized and focus is slightly blurred.

In one embodiment of the invention an image capturing device with an array of red, green and blue sensors (i.e., R, G, and B pixels) and an appropriate lens/optical system is placed in an enclosure that provides a light-tight seal around a target area of which the color is to be measured, with such area in the field of view of the imaging device/system. A region of interest is defined as some or all of the pixels in view of the target. The enclosure contains a stable light source that illuminates the target. Adding appropriate input/output and control capabilities, the device can accumulate data from the pixels in the region of interest over multiple images (frames). After the data are accumulated, a representative color value is determined to provide an accurate and consistent set of R, G and B values that can be used to identify the target color. In one embodiment the average pixel value is calculated. In other embodiments, additional mathematical operations may be performed to make further conversions and adjustments to the color readings.

One manifestation of the invention is a method for providing an intensity or brightness measurement using a digital image-capturing device comprising:

selecting a region of interest within the field of view of the image-capturing device, the region of interest containing pixels, generating brightness values for the pixels in the region of interest, accumulating the brightness values of the pixels in the region of interest; and determining a pixel value representative of the brightness of the pixels in the region of interest.

Another manifestation of the invention is the method as described above wherein the representative pixel value is the average value.

Another manifestation of the invention is the method as described first above wherein the representative pixel value is the median pixel value.

Another manifestation of the invention is the method for making a color measurement as described above wherein the region of interest contains three or more color-selective pixel types, such as red, green and blue pixels and the step of accumulating the brightness values includes individually accumulating brightness values for each of the red, green and blue pixels and the step of determining a representative pixel value includes determining a representative red, green and blue pixel value.

Another manifestation of the invention are the methods as described above wherein the step of accumulating the brightness values includes accumulating the brightness values for multiple image frames.

Another manifestation of the invention is the method as described above wherein the region of interest is at least 2×2 pixels and up to 100×100 pixels and more typically about 20×20 pixels. However the field of interest can be any shape include rectangular, hexagonal, diamond, circular, etc.

Another manifestation of the invention is the method as described about wherein the number of image frames is at least 3 and may range up to substantially any number but is typically 10 and still more typically five or less.

In another manifestation of the invention as described above, the image-capturing device is a digital camera or an image-capturing chip.

In accordance with a more particular manifestation of the invention, the steps of data collection and processing are conducted using different circuitry dedicated to each task.

A measurement device in accordance with one embodiment of the invention has one or more of the following features:

(a) a surface structure containing the aperture through which the measurement will be made that provides a stable, fixed parallel orientation of the focal plane of the image—capturing device relative to the target plane;

(b) a contact surface is provided that surrounds the aperture and has sufficient area to enable that a light-tight seal is formed between the target area and the device;

(c) a recessed area, inset away from the target area by about 0.125" or greater is provided such that the measurement device does not contact the target in the immediate vicinity of where the measurement is to be made, but allows the outer perimeter of the device to form a light-tight contact surrounding the target.

In accordance with another manifestation of the invention, the measurement device includes an image-capture device and a processor device and a memory location for accumulating color data such as RGB intensity or brightness data and the processor or logic device is programmed to perform the color measurements described herein.

DETAILED DESCRIPTION

Operational Overview

Figure 5:
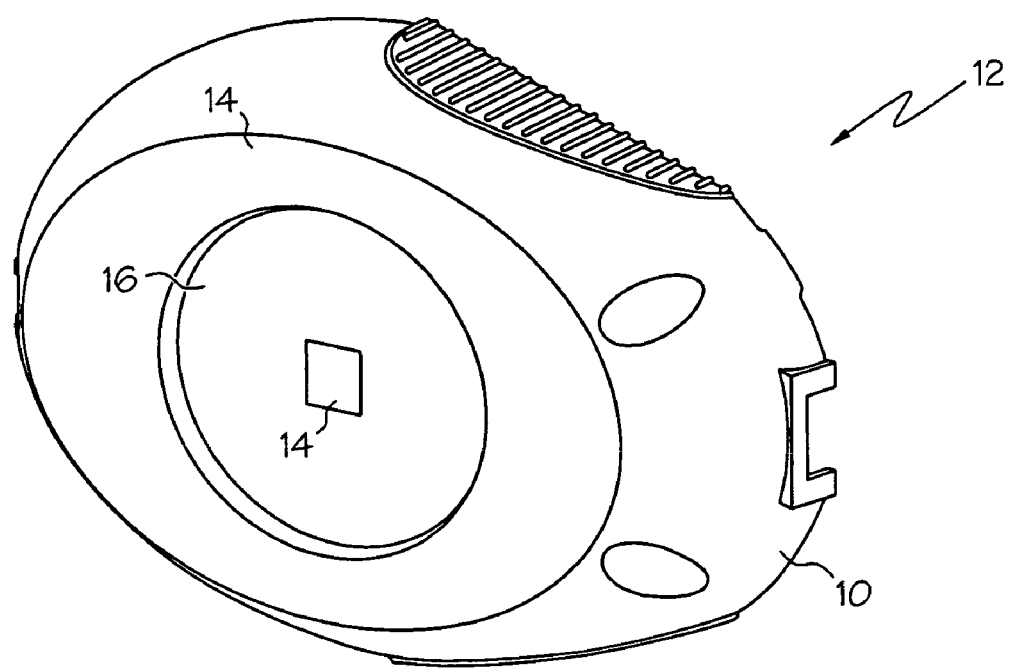
FIG. 5 is a perspective view of a front housing of an imaging device.
Figure 6:
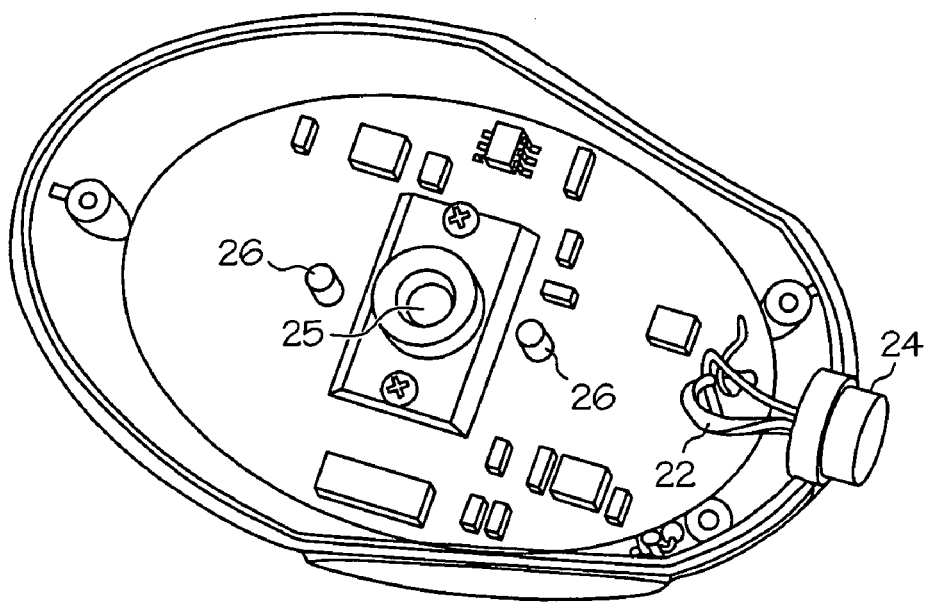
FIG. 6 is a perspective view of the back housing of an imaging device including the supporting circuitry.

An electronic image capture device or system (typically an imaging chip such as that used in a digital camera or the camera itself) is typically designed to capture images as an array of red, green and blue pixels. The devices generate values proportional to the amount of light (of each color) that strikes each pixel. One image capture device that can be used in one embodiment is shown in FIGS. 5 and 6. This device is particularly useful in making skin color measurements.

While the devices are typically used to capture an entire image, the data collection method described herein may or may not collect an entire image. For example, pixel data for one or more areas, portions of the image, or regions of interest where a color measurement is desired can be collected. This invention in certain embodiments also provides a set of operating conditions for a digital imaging device that will enable the device/system to provide highly accurate and consistent color information.

Figure 1:
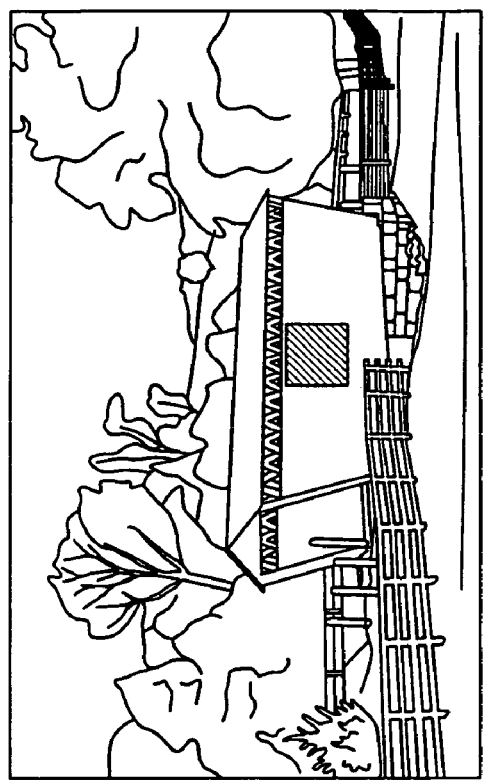
FIG. 1 is a pair of photographs illustrating the selection of a target (dark) area for measurement in accordance with the invention.
Figure 1:
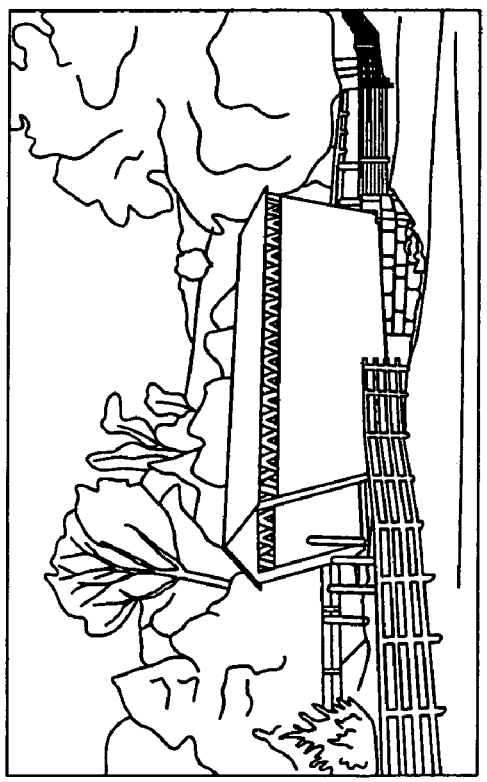

An electronic image capture device/system is configured to capture an image such as those shown in FIG. 1. One or more regions of interest (as depicted by the hash-lined square in the image on the right) is selected as the point at which a precise measurement of the color of the target is desired.

The size of the region of interest (e.g., captured as x pixels by y pixels) will vary with the optics used with the image capture device and the characteristics of the item being imaged. Typically an image capture device/system organizes its array of pixels in rows of Green and Red-sensitive pixels, alternating with rows of Blue and Green-sensitive pixels as described by Bayer, et al. in U.S. Pat. No. 3,971,065. The size of the region of interest must be at least 2×2 pixels to ensure that one pixel of each color sensitivity is included. In practice, a region of interest this small would not allow much pixel variation, however, and should be avoided. A larger area should be chosen to allow data from multiple pixels to be averaged together to eliminate the effect of any anomalies in the target (e.g., dust, scratches, smudges etc.). The region should not be so large, however, that the color of the target is not consistent throughout the region. In FIG. 1, if the region of interest is too large, it could include segments of the fence or roof which introduce a different color.

In practice, a region that includes 20×20 pixels has been found to be adequate. The region as shown is square, but in practice, the region may have any shape. Although not required, simplicity suggests selecting a region of interest with that is square, and has an equal number of red and blue pixels, and twice that number of green pixels.

Figure 2:
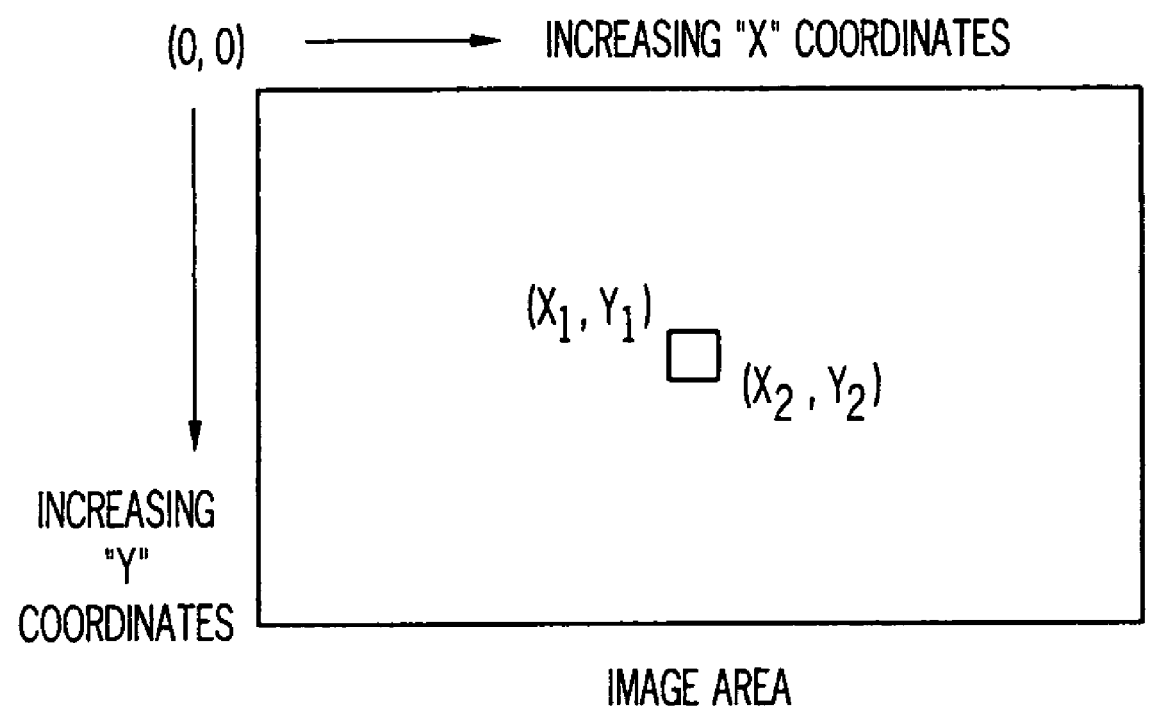
FIG. 2 is a diagram illustrating the identification of pixels.

The specific pixels in the region of interest may be identified, as shown in the illustration in FIG. 2, where the upper leftmost pixel in the region of interest is $(x_1, y_1)$ and the lower rightmost pixel in the region of interest is $(x_2, y_2)$.

In one embodiment, memory locations are reserved for use as accumulators for pixels of each color in the region of interest. For a single region of interest, regardless of its size, three memory locations are typically used, one each for data from the red, blue, and green pixels in the regions. (Optionally, data from the green pixels can be accumulated in separate registers and combined later.) Care must be taken that each location is big enough to allow summing the data for that pixel color without overflow. So, for example, if each pixel provides an 8-bit number, the maximum value is 256. In a 20×20 array, there would be 100 red and blue pixels, and 200 green pixels. Therefore the red and blue accumulators must have capacity for a number up to 25600 (256×100) and the green accumulator for a number up to 51,200 (256×200) if all green data is to be summed in one accumulator. (Proportionally more capacity is required if more than one frame is to be used to allow additional averaging and further reduce the impact of noise, as discussed below.)

Figure 4A:
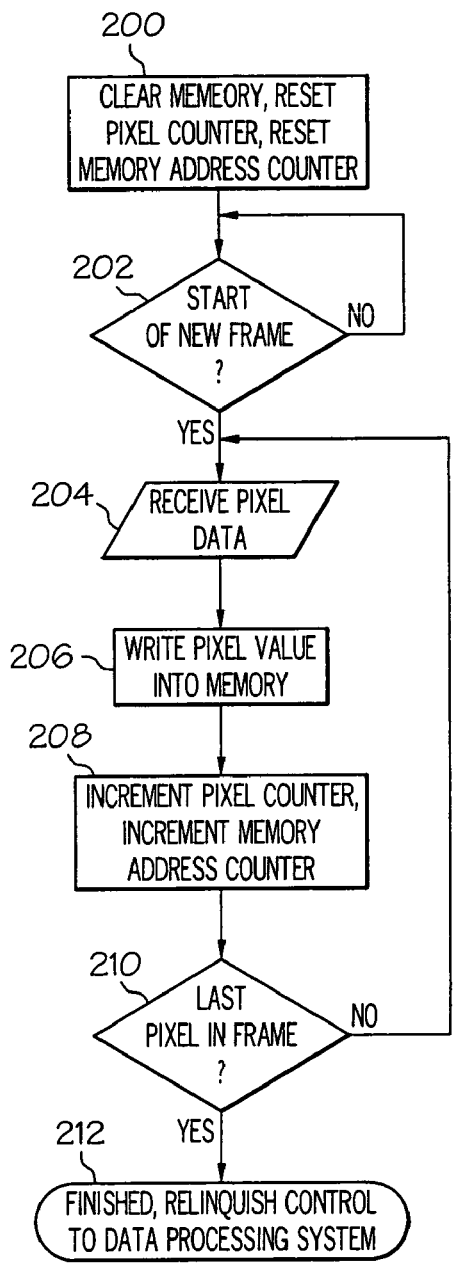
FIG. 4 is a flow chart illustrating an embodiment of the invention in which the data collection and processing functions can be carried out individually using distinct logic devices.
Figure 4B:
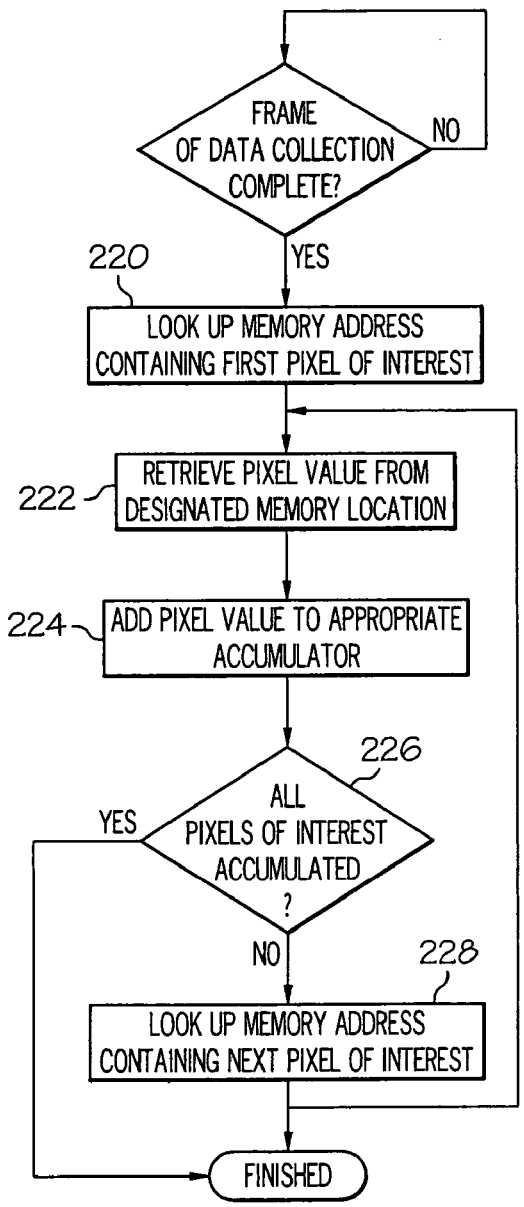

Alternatively, if desired, the pixel data may be temporarily stored in memory, and the process outlined in the preceding flowchart can be used to process those data and accumulate values for the regions of interest—as discussed regarding FIG. 4.

The minimum number of frames of data that may be considered is one. However, even in the most stable of conditions there will likely be externalities that cause short-term and long-term variance in the reported data. Short-term variabilities (e.g., electrical noise) can be reduced by averaging together multiple readings (frames) for each pixel/region. However, as more frames are collected, data-collection time increases, and long-term variabilities (e.g., electrical components heating up) may begin to de-stabilize the system and impact the readings. Collecting fewer readings (frames) and collecting them as quickly as possible will mitigate the influence of long-term externalities. Therefore, the number of frames must be selected to optimally balance between mitigating short-term and long-term variabilities. In practice, collecting data over 5 frames has been found to provide satisfactory results.

Figure 3:
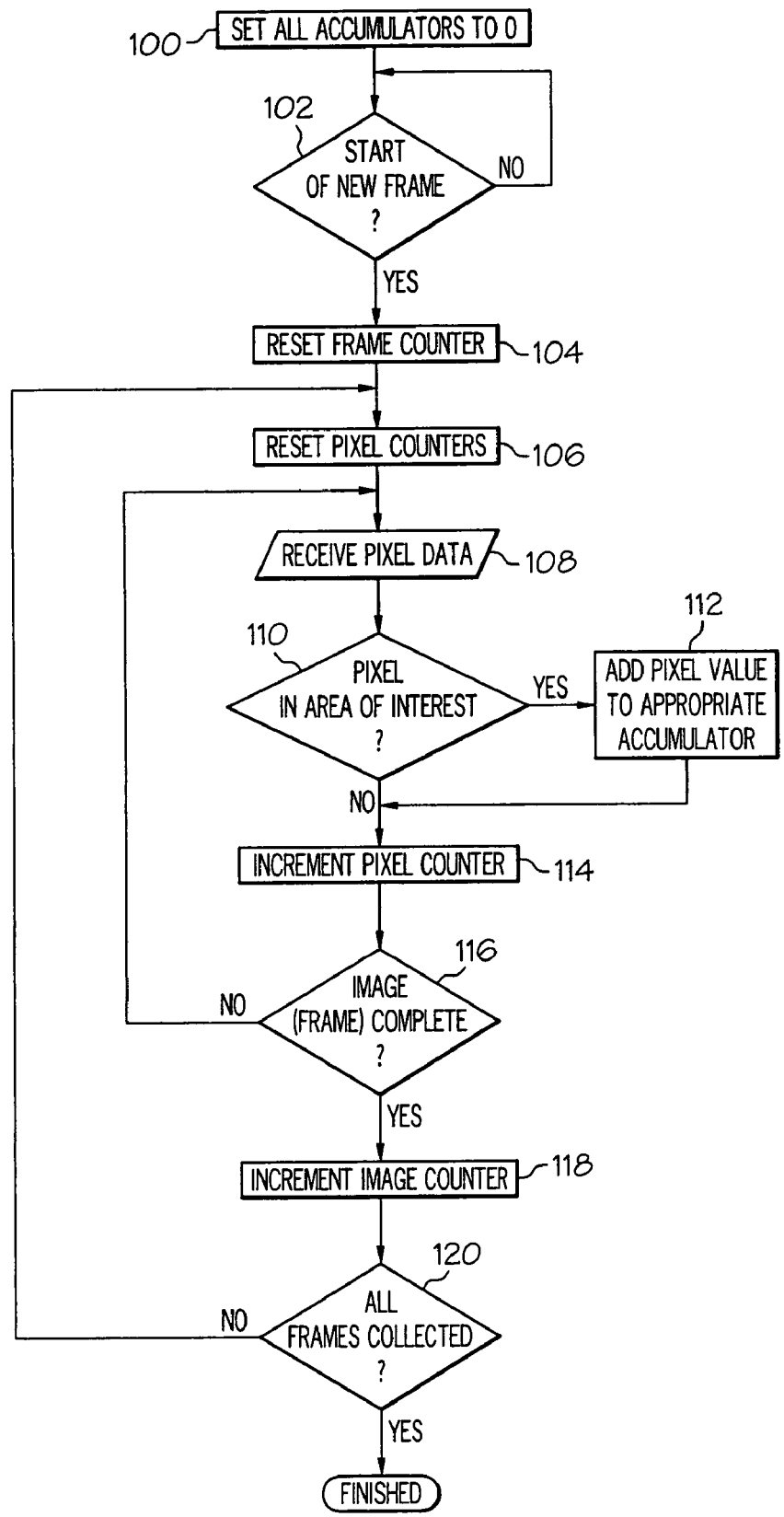
FIG. 3 is a flow chart illustrating one non-limiting exemplary embodiment of the invention.

With the region of interest and the accumulators established in another embodiment, data can be collected using the process outlined in the flowchart in FIG. 3 or 4.

Before collecting the data for the color measurement for the target area, the accumulator memory locations are set to 0 as indicated at Step 100 in FIG. 3 and a determination is made regarding whether the data is for a new frame or an existing frame at Step 102. If the data relates to a new frame, the frame counter is set or reset at 104 and the pixel counters are reset at 106. The R, G, and B pixel data is received at Step 108. In this process, because data is available from pixels within and without the target area, each pixel is evaluated to determine whether it is within the pixel area of interest at 110. If the pixel is within the target area, the pixel R, G, and B values are added to the corresponding accumulator at 112 and the pixel counter is incremented at 114. If the pixel is not in the target area of interest, the pixel value is not added to the accumulator. If the frame is complete, the frame counter is increased at 118. Until then, the next pixel is analyzed and the data continues to be added to the accumulators at 112 as discussed above. When the frame is complete, the counter is incremented. When data for all of the frames has been collected at 120, the process is finished and the accumulator values are averaged. On the other hand, if data for the predetermined number of frames has not been collected, the pixel counters are reset at 106 to receive pixel data for the next frame.

When the desired number of frames have been processed, an average value may be computed. The divisor is the number of frames of data collected times the number of pixels in the region of interest of that color. So, with 5 frames of a 20×20 region of interest the divisor would be 500 for the red and blue pixels and 1000 for the green pixels.

In accordance with one embodiment of the invention, the electronic image capture device is interfaced with a very fast logic device(s) to provide data capture at a speed that is fast enough to handle the uncompressed raw data generated by the image capturing device. As the image capturing device streams out data, the logic device moves each raw data point into memory. When the entire image has been captured in accordance with one embodiment of the invention, control is relinquished to a second logic device or devices that provide the data processing function to extract and analyze the pixel data of interest. Alternatively, in accordance with another embodiment, because not all pixels from the image are necessarily needed for color calculations, the data capture process can be terminated when all of the required pixels have been streamed into memory, i.e., in effect ignoring the remainder of the pixels in the frame. In still another embodiment, using imaging chips which allow specific pixels to be requested, only the data from the pixels in the requested locations can be transmitted. In this case, the data capture process can be refined to handle only the pixels of interest. In this case, data capture could be performed using the same or a separate logic device for data processing.

FIG. 4 is a flow chart illustrating one non-limiting example of a process in accordance with the invention in which dedicated data collection and data processing circuitries are used. In the flow chart, FIG. 4A illustrates the process as performed by the data collection circuitry. Analogous to FIG. 3, before collecting the data, the memory is cleared and the pixel counter and memory address locations are set to zero in step 200. In step 202, a new frame versus existing frame determination is made. If the data relates to a new frame, the RGB pixel data is received at step 204 and written into memory in step 206. With each pixel data, the pixel counter and the memory address counter are incremented in step 208. In step 210, the system determines whether the received pixel data represents the last pixel in the frame or the last pixel in the area of interest. When the frame is complete, the process control is transferred to the data processing logic circuitry in step 212. It is not required to move all the pixel data in the image into memory. If the logic device supports the function, only the pixel data in the target area may be moved into memory or only a portion of the image data is moved into memory. For example, in one embodiment, it may be determined that the target area is located in the first half or third of the image. In this case, only that portion of the image data may be moved into memory and the pixel data may be accumulated from the target area in that portion of the image data moved into memory. This way it is not necessary to move all the pixel data into memory. This may provide faster and more efficient use of the data.

With the pixel data collected from the image capture device and placed into memory, the data processing circuitry determines the memory address containing the first pixel of interest in step 220. The pixel value is retrieved in step 222 and added to an accumulator in step 224. The pixel values are accumulated in step 226 until all of the pixels of interest have been accumulated. Pixel values are accumulated in this embodiment by a process of looking up the address containing the next pixel of interest as shown in step 228 and repeating the process of retrieving the pixel value in step 222 and adding the pixel value to the accumulator in step 224. When all of the pixel values have been accumulated, the color measurement is determined as discussed previously.

The process outlined above will accumulate pixel data and average out the effects of random noise, imperfections in the image, and irregularities in the imager. However, image capture devices typically include features that allow them to automatically adapt to a variety of environments (e.g., different lighting conditions) and while this contributes to their versatility and usually results in a pleasing image overall, it creates significant variation in the values generated from the pixels of each color. In certain embodiments, it is desirable to disable and/or preset one or more of the automatic functions and operate the device in a reasonably fixed, stable state, that is conditions that are optimized for color measurement. Each of these settings is discussed below. Not all imaging devices/systems may allow access to all of the settings as described, and while the described settings tend to optimize performance, generally any setting may be chosen.

Gain. It is desirable to set gain to the lowest possible value to reduce noise, but high enough that the device is just below saturation when presented with the brightest possible image to use its full dynamic range. This can be accomplished by presenting an all white target to the device/system. With an 8 bit device, for example, it would be desirable to set the gain such that the pixel values are near their saturation value of 255. The gain setting will depend on shutter width (see below).

Shutter Width/Integration time. Shutter width (also sometimes referred to as integration time) should be set to the highest possible value, but, like gain, just below the value at which any pixel saturates when presented with the brightest possible image.

In practice, because settings for shutter width and gain depend on each other, one method by which values can be determined is to set the gain at unity (1) for each channel (R, G and B), and then, with the references and target all changed to white, increase the shutter width until one of the pixel accumulators reaches saturation. (This value must be calculated based on the maximum value that a pixel can return, the number of pixels the accumulator contains, and the number of frames taken.) If none saturate when the shutter width reaches its limit, repeat the process with a slightly higher gain. Continue until at least one channel saturates. Having established the maximum shutter width and the gain for one channel in this way, the gains for the remaining channels can be increased while keeping the shutter width constant until they, too, are equal or nearly equal (keeping the references and target white) and near their saturation point.

Blanking. Both horizontal and vertical blanking should be set to zero to maximize imager speed, assuming that the chosen processor can perform the necessary operations without any built in delays and that the light source in use is not operating at a frequency that could affect the capture of the image.

Focus. Focus on the target should be slightly blurred. This will still allow good recognition of the target color, but will mask any small imperfections such as dust or scratches.

Black compensation. Black compensation should be disabled. This prevents the imaging device/system from attempting to adjust or "normalize" the output of the device, which is generally desired when capturing a full image, but distorts the data when attempting to do an accurate measurement of color.

Compression. All compression algorithms (e.g., jpeg) should be turned off to avoid loss of data.

Although any color digital image capture device may be used, in a particular embodiment the device is a CMOS imaging chip with at least 240×320 resolution, and an analog-to-digital converter that produces at least 8 bit results from each pixel. Ideally, the "raw" data from the chip should be accessible without compression or additional processing other than the digital-to-analog conversion.

The faster the pixel data can be accumulated, the more that longer-term environmental variations (like temperature or illumination changes) can be avoided, and the less likely it will be to "miss" pixels. In one embodiment, a processor is chosen that can perform the necessary operations on data from each pixel before data from the next pixel arrives. One effective technique is use of an FPGA (Field Programmable Gate Array) which, due to its relative simplicity, is inherently fast.

To obtain steady illumination of the imaging device/system, for small targets in a confined enclosure, white LEDs driven by a constant DC current source have proven to be one method of providing effective illumination. Although many configurations are possible, these items may be designed onto a circuit board and placed into a compact enclosure (along with the necessary power, control, and user interface circuitry) as shown in FIG. 5 to make a small, hand-held device that can illuminate a target and measure its color.

The method of the invention, in one embodiment, can be implemented using the hand held device shown in FIGS. 5 and 6.

The front housing 10 shown in FIG. 5 is elliptical in shape, although other overall shapes are possible, with a major axis of roughly 3.75 inch and a minor axis of 2.25 inch. This configuration has the added advantage of being compact enough and ergonomically convenient to be easily hand held.

The side 12 of this device that is placed against the target area, e.g., the skin, to make measurements is sufficiently flat to provide a light tight seal, with the aperture 14 through which the color measurement is taken typically in its center. The aperture in this particular case is square, measuring 0.2 inch on a side but the shape of the aperture and its size can vary. In the method described above, the target area (e.g., the shaded area in the right-hand photo in FIG. 1 may correspond to all or a portion of the area of the aperture 14.

Concentrically surrounding the aperture is an elliptically-shaped recess 16. The major axis of this recessed area is 1.5 inch. The minor axis is 1.25 inch, and it is recessed 0.125 inch from the surface of the ellipse in a direction away from the target to provide a stable, fixed orientation in which the target and the focal plane of the chip are in spaded parallel planes. Again the exact shape of the recess is not particularly critical. What is important is that the recess is surrounded by a contact surface 18 that enables a light tight seal to be formed around the target area. The recessed area preferably has a surface area large enough that the measurement aperture can be located such that a boundary of at least 0.5 inch exists between the outer perimeter of the measurement aperture to the edge of the recessed area in all directions. A recessed area, inset away from the target area by about 0.125 inch or greater is provided such that the measurement device does not contact the target in the immediate vicinity of where the measurement is to be made, but allows the outer perimeter of the device to form a light-tight contact surrounding the target. The contact surface surrounds the aperture and has sufficient area to enable that a light-tight seal is formed between the target area and the device. In one embodiment, the contact surface should be at least about 0.25 inch wide. The device also presents a generally fixed and reproducible distance between the target area and the focal plane of the image-capturing device such as a charge coupled device or imaging chip (not seen) that is provided on a circuit board 22 in the back housing 24. The housing containing the aperture through which the measurement will be made that provides a stable, fixed parallel orientation of the focal plane of the image-capturing device relative to the target plane. In a particular embodiment, the imaging chip is a model MI-0133, a ⅐ inch CMOS 377H× 312V sensor, commercially available from Micron Technology and the device includes a lens 25 and two white LED's 26 as an internal source to illuminate the target area. In this embodiment, two LED's are used to provide the desired illumination intensity. One or more LED's can be used for this purpose depending on the characteristics of the LED and the target area the device may be designed.

These dimensions are preferably optimized such that an area of skin or other target can be measured for color without creating distortion or discoloring. The surfaces 18 that contact the skin are sufficiently distant from the measurement aperture 14, minimizing color distortion at the point of measurement, and simultaneously preventing entry of ambient light by making positive contact with the skin.

To make readings of skin color, the device in this configuration is held gently against the skin at one or several locations. The device is held flat on the surface of the skin with sufficient pressure to seal out ambient light, but not so much pressure that the recessed area contacts the skin and cause discoloration (by effecting blood flow to the area, or any other cause). Electronics inside the device can then illuminate the skin and through appropriate optics, electronic sensors can analyze the reflected light to determine skin color.

In accordance with another embodiment of the invention, the color measurement device is a "plunger-style" device including a housing 51 that contains the electronics and optics, and a targeting platen 52 below it, connected in a more particular embodiment by a spring-loaded mechanism. In the device's "relaxed" state—when it is not taking a measurement—there is an opening 59 or viewing area between the housing 51 and the platen 52 such that the user can see through a targeting window 56 in the platen 52 to locate the specific region of interest on the surface to be measured.

Figure 8:
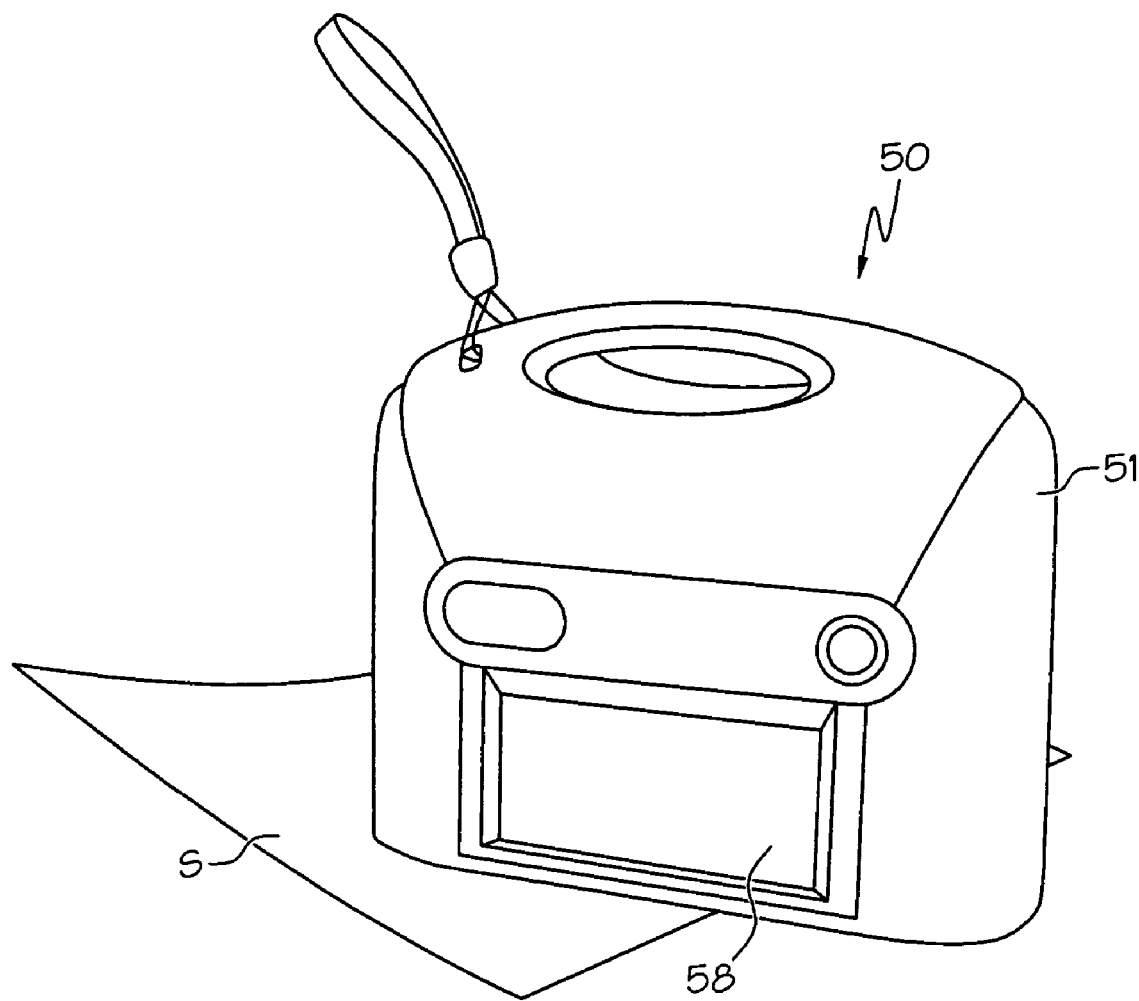
FIG. 8 is a perspective view of the device shown in FIG. 7 an a closed position.

To put the device in its "active" state the user pushes down vertically on the housing 51. The housing descends down and around at least the target area in platen 52, completely sealing out external light. When the housing 51 reaches its bottom-most position, as shown in FIG. 8 for one embodiment, the measurement is taken. When released, a spring mechanism pushes the housing open, separating it from the platen such that the targeting area is once again visible. If there is not a spring mechanism, the housing could be opened manually.

In one embodiment, the device includes a display 58 that reports relevant measurement information. For example, the display may indicate the product identification of a matching paint or indicate whether the tested color is compatible with a stored or previously measured color, or the display may indicate the color values for the color. Alternatively, in lieu of a display, the device may include a panel of indicator lights that would signal whether the measured color is an acceptable match or similar information based on the color measurement.

Particular Embodiment

The housing 51 housing travels on rails 57 in columns 60 that allow the housing to be pushed into engagement with the platen such that the housing completely envelops the target window in the platen and forms a light-tight seal about the target area.

Figure 7:
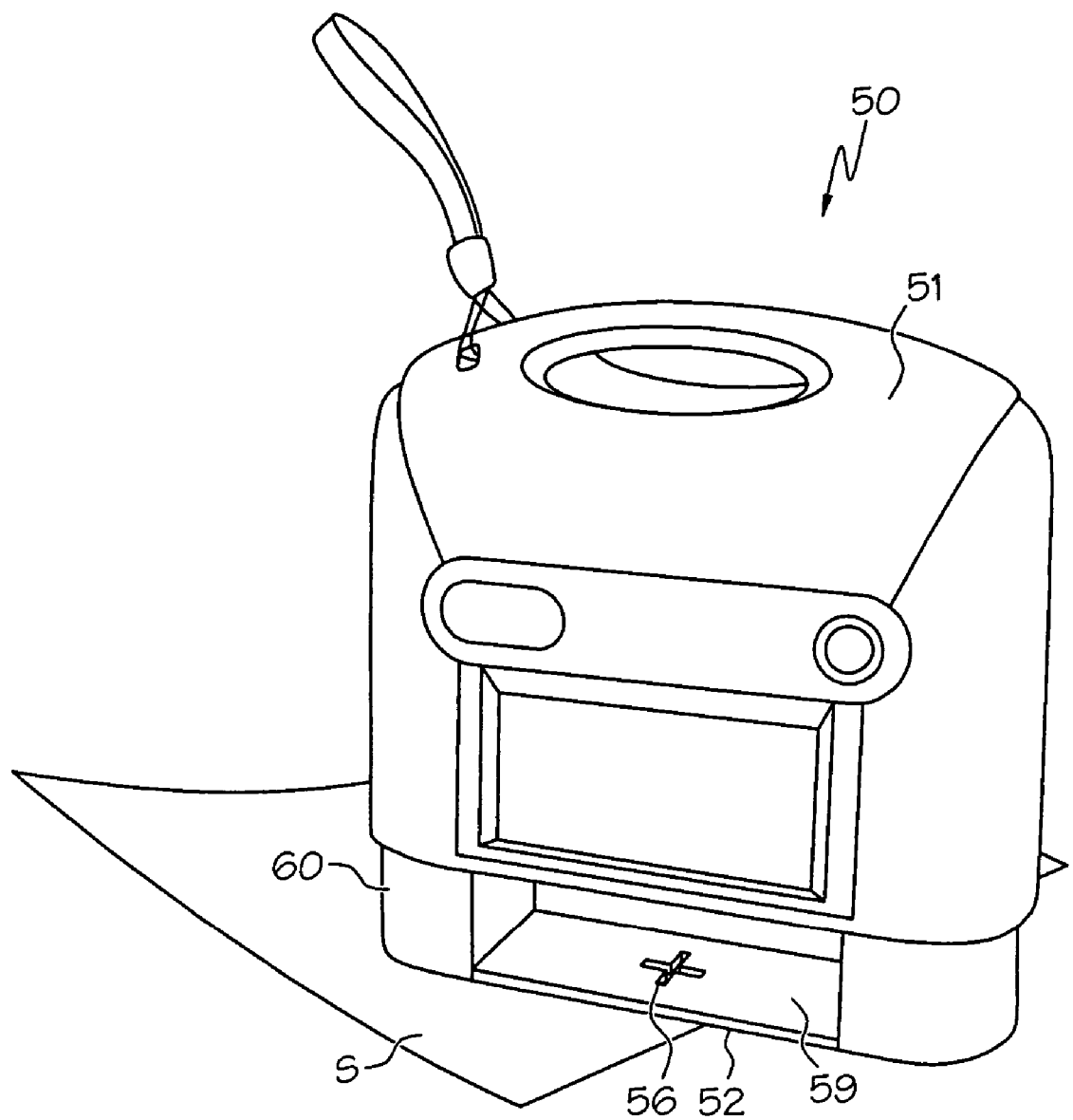
FIG. 7 is a perspective view of an imaging device useful in accordance with one embodiment of the invention in its open position.

In a particular embodiment the housing 51 is spring-loaded on the rails so that the housing returns to an open position after the measurement has been made. In a more particular embodiment the housing 51 and platen 52, when in the relaxed state, are separated such that a user can see into the opening 59 between them (which is ideally 0.5 inches high or greater) and locate sample(s) in the target area of the platen. The platen has an opening 56 or openings that allow the user to see the item or surfaces to be measured below the platen (from which a color measurement is desired). A molded in "bulls-eye" type pattern is useful for this purpose. Although many configurations are possible, one device is compact enough to be hand held, yet large enough to contain all of the necessary components. In practice, dimensions of roughly 3" wide by 1.5" deep by 4" high (in the relaxed state) have been found to be a convenient size. Such a device is shown in FIG. 7.

Typically the target area 56 in the platen 52 is an opening that would be centered along the width of the device, but moved as close to the front of the device as the internal components allow, to make it as easy as possible for the user to see the target surface through opening in the platen at a convenient angle. The platen itself should be wide and long enough that when the test surface is placed in the target window, light emanating from between the bottom side of the platen does not enter the target window.

Figure 9:
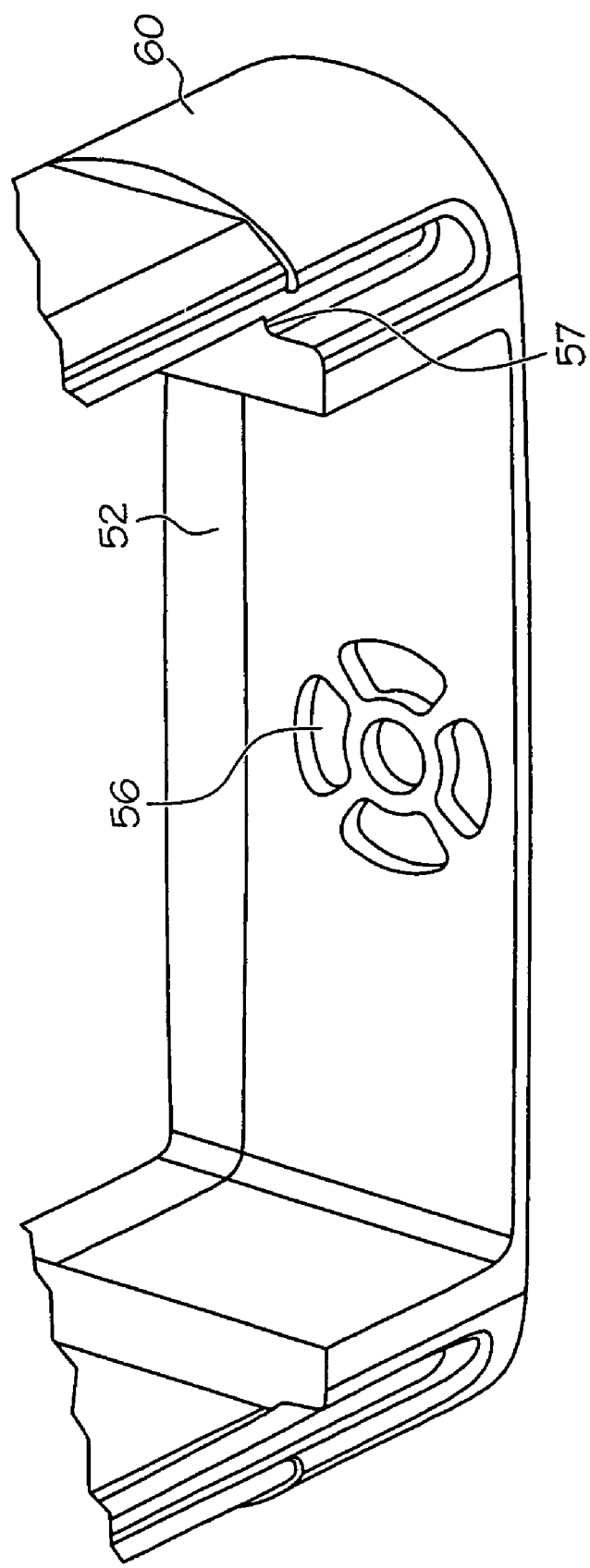
FIG. 9 illustrates a platen used in the device of FIGS. 7 and 8.

The platen 52 can be made of injection molded plastic, and the target window tooled in the mold could be a bulls-eye design (See FIG. 9). Alternatively, a "cross-hairs" design will also provide a convenient method of targeting.

Further, in a particular embodiment, the opening between the housing and the platen would be designed so that the platen is viewable along as much of its width as possible, both in the front and back, so as to allow as much ambient light as possible to illuminate the target area so the target surface can be easily viewed by the user in locating the target window over the appropriate area of the test sample. Alternatively, the target may be illuminated by an artificial light source contained in the housing. The platen can be reinforced with ribs if required. The platen might also be formed with an upright back wall to add reinforcement, however, this is less desirable in that it limits the viewing angles from which the user can observe the test surface through the opening in the platen.

In more detail, the device in this configuration is held against the surface (S) from which a color measurement is desired. This surface may be solid in color or have a complex intricate pattern. If the surface has a pattern, the device may be moved to a position such that the section of the pattern for which a color measurement is desired shows through the target window 56 in the platen 52. The user positions the device on the surface (S) by looking into the space 54 between the platen 52 and the housing 51 and adjusting the position of the device on the surface S through the window 56. When the device is positioned accurately, the user presses downward on the housing 51. The housing slides down the rails 60 and encloses at least the target area in the platen 52. When the housing has fully enclosed the target in the platen (its bottom-most position), an internal switch (not shown) triggers the electronics to take a measurement. Electronics inside the device illuminate the target region and through appropriate optics, electronic sensors can analyze the reflected light to determine its color. Once the measurement is complete, the user releases the vertical pressure on the housing, and the internal spring mechanism (when present) separates the housing and the platen, making it possible to re-position it for the next color measurement. The color measurement or other information based on the measurement is displayed on the display 58 in this embodiment.

Having described the invention in detail and by reference to specific embodiments thereof, it will be apparent that numerous variations and modifications are possible including without departing from the invention as defined by the following claims.

What is claimed is:

1. A device for measuring the color of a target area in an image comprising:
    a housing including an image-capture device,
    a processor or logic device,
    a memory location, and
    a platen having an aperture therein through which the color measurement is made,
    the housing being mounted on a pair of rails to reciprocate along a straight line with respect to the platen between a first and a second position, wherein in the first position the housing is spaced from the platen such that a user of the device can position the aperture over the target area and in the second position the housing encloses the aperture in the platen to provide a light-tight seal for the aperture for measuring the color of the target area.

2. The device of claim 1 wherein by closing the housing about the aperture, the image-capture device captures an image of the aperture from which the color measurement is made.

3. The device of claim 2 wherein the housing is spring loaded in the rails.

4. The device of claim 1 wherein the image-capturing device is a digital camera or an image-capturing chip.

5. The device of claim 1 wherein the image-capturing device is a CMOS imaging chip.

6. The device of claim 1 wherein said device is hand held.

7. The device of claim 1 further comprising a switch that triggers the device to take a measurement when the housing fully encloses the aperture.

* * * * *